July 27, 1937.  F. G. RICHARDSON  2,088,344
SNAP FASTENER FOR TRIM STRIPS
Filed July 9, 1934
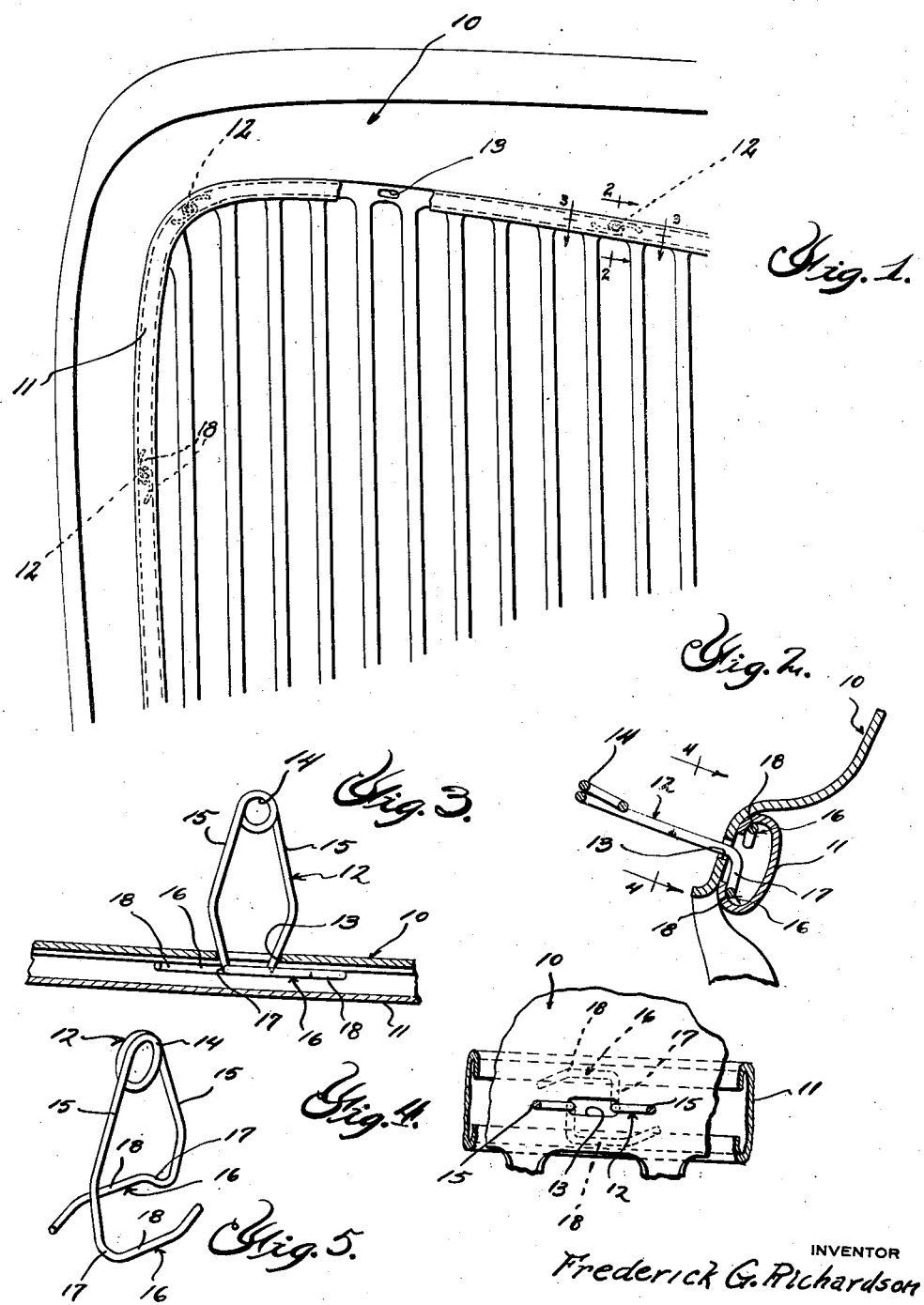
INVENTOR
Frederick G. Richardson Patented July 27, 1937

2,088,344

UNITED STATES PATENT OFFICE 2,088,344

SNAP FASTENER FOR TRIM STRIPS

Frederick G. Richardson, Detroit, Mich., assignor to Briggs Manufacturing Company, Detroit, Mich., a corporation of Michigan Application July 9, 1934, Serial No. 734,408

4 Claims. (Cl. 189—88)

This invention relates to snap fasteners and more especially to snap fasteners designed for securing sheet metal trim strips, moldings and the like to a supporting structure.

In accordance with my invention, I produce a snap fastener formed of resilient material having a shank portion capable of contraction and expansion upon insertion in an opening in the supporting structure and having an attaching portion capable of lateral expanding movement to frictionally engage the inner wall of the channel of the trim strip to secure the fastener to the trim strip against accidental longitudinal movement with respect thereto.

The several objects, advantages and novel details of construction of this invention will be made more apparent as this description proceeds, especially when considered in connection with the accompanying drawing, wherein Figure 1 is a fragmentary elevational view of a supporting structure such as an automobile radiator shell having a trim strip attached thereto by my improved snap fastener;

Figure 2 is an enlarged fragmentary sectional view taken substantially on the plane indicated by line 2—2 in Figure 1;

Figure 3 is a sectional elevational view taken substantially on the plane indicated by line 3—3 in Figure 1;

Figure 4 is a sectional view taken substantially on the plane indicated by line 4—4 in Figure 2, and Figure 5 is a perspective view of the snap fastener.

In the herein illustrated embodiment of my invention, I have shown my improved sheet metal snap fastener stud used for securing a trim strip to an automobile radiator grill or shell. Obviously, however, the invention may be advantageously employed in various other assemblies.

In Figure 1 there is fragmentarily illustrated a shell 10 having a trim strip or decorative bead or molding 11 secured thereto by a plurality of my improved snap fastener stud members 12. The snap fasteners engage apertures 13 formed in the supporting structure.

The trim strip or molding 11 is of well-known construction, the same being formed of sheet metal and fashioned to provide a substantial channel shape in cross section, the longitudinal edges being folded under and arranged in substantially opposed spaced relation to one another.

The snap fastener 12 is formed of a single piece of resilient material, preferably wire, and is bent intermediate its ends to form a loop 14 forming a rounded nose or head adapted to facilitate the insertion of the fastener into the apertures 13 of the supporting structure. Extending from the head portion 14 are a pair of leg portions 15 bowed intermediate their length to form diverging and converging portions. As the fastener is inserted in the openings in the supporting structure, the legs are forced toward one another until the outwardly bowed portions pass through the aperture whereupon the legs again spring apart to resiliently retain the fastener in engagement with the edge of the aperture.

The legs 15 terminate in attaching portions 16 in the form of feet. In forming the attaching portions 16, the material is first bent laterally at a substantially right angle to the adjacent leg portion, as at 17, in a plane substantially perpendicular to the longitudinal plane of the adjacent leg portion and then bent at right angles thereto to form the pair of substantially parallel oppositely extending portions 18. Thus the attaching portions comprise laterally spaced feet which effectively secure the fastener element to the trim strip and hold the same perpendicular thereto.

By laterally compressing the feet portions of the fastener, the fastener may be inserted in the channel of the trim strip, preferably into an open end thereof, and when released expands to cause the portions 18 to frictionally engage the sides of the channel to hold the fastener element against accidental sliding movement longitudinally of the channel. The frictional engagement is such, however, that by lightly forcing the fastener element it may be moved longitudinally of the trim strip to properly position the fastener for engagement with an opening 13 in the supporting structure.

It is obvious that as the legs of the fastener element enter the apertures 13 in the supporting structure, these legs together with the attaching portions move toward one another to permit contraction of the fastener element sufficient to enable it to enter the aperture. Thus the attaching portions of the fastener are capable of relative movement in directions toward and away from one another and in directions substantially at right angles to the directions aforesaid.

With my improved snap fastener element, trim strips and the like may be more readily attached to a supporting structure because the fastener elements may be distributed along the trim strip and properly spaced for registration with the openings 13 in the supporting structure and when thus spaced will be frictionally held against movement longitudinally of the trim strip thereby greatly facilitating the assembly operation. The present structure offers the additional advantage that any possibility of rattling due to loose fit between the fastener element and trim strip is eliminated.

It will be obvious to those skilled in the art that my improved snap fastener may be employed with equal facility in other types of assemblies, and the herein illustrated embodiment of the invention should not be considered as limiting the same, reservation being also made to make such changes as may come within the purview of the accompanying claims.

What I claim as my invention is:

1. In combination with a channel-shaped strip and a support therefor having an opening therethrough, a snap fastener for detachably securing the channel-shaped strip to the support, said snap fastener comprising a part having resilient outwardly bowed leg portions disposed substantially in a plane extending in the direction of length of the strip and insertable within the opening in said support, said leg portions terminating in angularly bent extensions engageable in the channel of the strip and normally urged in opposite directions transverse of the strip by the leg portions into frictional engagement with the inner walls of the channel-shaped strip.

2. In combination with a channel-shaped strip and a support therefor, a snap fastener for detachably securing the channel-shaped strip to the support, said snap fastener comprising a part having resilient outwardly bowed leg portions adapted to spring toward each other upon insertion of the leg portions through an opening in the support, and extensions upon the extremities of the leg portions located in the channel of the strip and urged by the leg portions in opposite directions transverse to the directions of flexure of the legs upon inserting the same in the opening of the support for frictionally engaging the extensions with the inner wall of the channel shaped strip.

3. In combination with a channel-shaped strip and a support therefor, a snap fastener for detachably securing the channel-shaped strip to the support, said fastener comprising a part having resilient outwardly bowed leg portions insertable within an opening in the support, said leg portions terminating in extensions extending in directions toward each other longitudinally of the strip and engageable in the channel of the strip, said extensions being resiliently urged into engagement with the inner side walls of the channel to frictionally hold the part aforesaid against accidental movement longitudinally of the strip.

4. In combination with a strip having laterally spaced projecting portions and a support therefor, a snap fastener for detachably securing said strip to the support, said snap fastener comprising a part having resilient outwardly bowed leg portions adapted to spring toward each other upon insertion of the leg portions through an opening in the support, and extensions upon the extremities of the leg portions located between the projecting portions of the strip and yieldably urged in opposite directions transverse to the directions of flexure of the legs upon inserting the same in the opening of the support for frictionally engaging the extensions with the projecting portions of the strip.

FREDERICK G. RICHARDSON.